US008149710B2

(12) United States Patent
Bergamasco et al.

(10) Patent No.: US 8,149,710 B2
(45) Date of Patent: Apr. 3, 2012

(54) FLEXIBLE AND HIERARCHICAL DYNAMIC BUFFER ALLOCATION

(75) Inventors: Davide Bergamasco, Sunnyvale, CA (US); Valentina Alaria, San Francisco, CA (US); Chiara Piglione, San Jose, CA (US); Michele Caramello, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1015 days.

(21) Appl. No.: 11/825,631

(22) Filed: Jul. 5, 2007

(65) Prior Publication Data
US 2009/0010162 A1 Jan. 8, 2009

(51) Int. Cl.
*H04L 12/26* (2006.01)

(52) U.S. Cl. ........................................ 370/235; 370/230

(58) Field of Classification Search .................. 370/235, 370/412, 395.41, 395.7, 331, 230.1; 710/52
See application file for complete search history.

(56) References Cited

U.S. PATENT DOCUMENTS

| 5,402,416 | A | 3/1995 | Cieslak et al. |
| 5,526,350 | A | 6/1996 | Gittins et al. |
| 5,742,604 | A | 4/1998 | Edsall et al. |
| 5,920,566 | A | 7/1999 | Hendel et al. |
| 5,946,313 | A | 8/1999 | Allan et al. |
| 5,974,467 | A | 10/1999 | Haddock et al. |
| 5,987,011 | A | 11/1999 | Toh |
| 6,021,124 | A | 2/2000 | Haartsen |
| 6,104,699 | A | 8/2000 | Holender et al. |
| 6,195,356 | B1 | 2/2001 | Anello et al. |
| 6,201,789 | B1 | 3/2001 | Witkowski et al. |
| 6,333,917 | B1 | 12/2001 | Lyon et al. |
| 6,363,477 | B1 | 3/2002 | Fletcher et al. |
| 6,397,260 | B1 | 5/2002 | Wils et al. |
| 6,404,768 | B1 * | 6/2002 | Basak et al. ............... 370/395.7 |
| 6,414,939 | B1 | 7/2002 | Yamato |
| 6,456,590 | B1 | 9/2002 | Ren et al. |

(Continued)

FOREIGN PATENT DOCUMENTS

CN 1778079 A 5/2006

(Continued)

OTHER PUBLICATIONS

F. Kamoun, L. Kleinrock, "Analysis of Shared Finite Storage in a Computer Network Node Environment Under General Traffic Conditions", IEEE Transactions on Communications, Jul. 1980.

(Continued)

*Primary Examiner* — Kwang B Yao
*Assistant Examiner* — Syed M Bokhari
(74) *Attorney, Agent, or Firm* — Weaver Austin Villeneuve & Sampson LLP

(57) ABSTRACT

In one embodiment, a method comprises the following steps: receiving a first set of inputs comprising a first plurality of entities and a first traffic behavior; determining a first region of a buffer corresponding to the first traffic behavior; assigning the first plurality of entities to the first region; determining hierarchical relationships between at least some of the first plurality of entities; determining a first shared buffer space of the first region; and assigning at least one threshold for each of the first plurality of entities. The threshold may comprise a maximum amount of the first shared buffer space that may be allocated to an entity. The method may also involve configuring a logic device to allocate the first shared buffer space dynamically according to the hierarchical relationships and the thresholds.

25 Claims, 9 Drawing Sheets

U.S. PATENT DOCUMENTS

| | | | |
|---|---|---|---|
| 6,459,698 B1 | 10/2002 | Achrya | |
| 6,504,836 B1 | 1/2003 | Li et al. | |
| 6,529,489 B1 | 3/2003 | Kikuchi et al. | |
| 6,556,541 B1 | 4/2003 | Bare | |
| 6,556,578 B1 | 4/2003 | Silberschatz et al. | |
| 6,560,198 B1 | 5/2003 | Ott et al. | |
| 6,587,436 B1 | 7/2003 | Vu et al. | |
| 6,636,524 B1 | 10/2003 | Chen et al. | |
| 6,650,623 B1 | 11/2003 | Varma et al. | |
| 6,671,258 B1 * | 12/2003 | Bonneau | 370/235 |
| 6,721,316 B1 | 4/2004 | Epps et al. | |
| 6,724,725 B1 | 4/2004 | Dreyer et al. | |
| 6,839,794 B1 | 1/2005 | Schober | |
| 6,839,858 B1 | 1/2005 | James et al. | |
| 6,885,633 B1 | 4/2005 | Mikkonen | |
| 6,888,824 B1 | 5/2005 | Fang et al. | |
| 6,901,593 B2 | 5/2005 | Aweya et al. | |
| 6,904,507 B2 | 6/2005 | Gil | |
| 6,934,256 B1 | 8/2005 | Jacobson et al. | |
| 6,934,292 B1 | 8/2005 | Ammitzboell | |
| 6,975,581 B1 | 12/2005 | Medina et al. | |
| 6,975,593 B2 | 12/2005 | Collier et al. | |
| 6,990,529 B2 | 1/2006 | Yang et al. | |
| 6,999,462 B1 | 2/2006 | Acharaya | |
| 7,016,971 B1 | 3/2006 | Recio et al. | |
| 7,020,715 B2 | 3/2006 | Venkataraman et al. | |
| 7,046,631 B1 | 5/2006 | Giroux et al. | |
| 7,046,666 B1 | 5/2006 | Bollay et al. | |
| 7,047,666 B2 | 5/2006 | Hahn et al. | |
| 7,093,024 B2 | 8/2006 | Craddock et al. | |
| 7,133,405 B2 | 11/2006 | Graham et al. | |
| 7,133,416 B1 | 11/2006 | Chamdani | |
| 7,158,480 B1 | 1/2007 | Firoiu et al. | |
| 7,187,688 B2 | 3/2007 | Garmire et al. | |
| 7,190,667 B2 | 3/2007 | Susnov et al. | |
| 7,197,047 B2 | 3/2007 | Latif et al. | |
| 7,209,478 B2 | 4/2007 | Rojas et al. | |
| 7,209,489 B1 | 4/2007 | Bailey et al. | |
| 7,221,656 B1 | 5/2007 | Aweya et al. | |
| 7,225,364 B2 | 5/2007 | Carnevale et al. | |
| 7,266,122 B1 * | 9/2007 | Hogg et al. | 370/395.41 |
| 7,266,598 B2 | 9/2007 | Rolia | |
| 7,277,391 B1 | 10/2007 | Aweya et al. | |
| 7,286,485 B1 | 10/2007 | Ouelette et al. | |
| 7,319,669 B1 | 1/2008 | Kunz et al. | |
| 7,349,334 B2 | 3/2008 | Rider | |
| 7,349,336 B2 | 3/2008 | Mathews et al. | |
| 7,359,321 B1 | 4/2008 | Sindhu et al. | |
| 7,385,997 B2 | 6/2008 | Gorti et al. | |
| 7,400,590 B1 | 7/2008 | Rygh et al. | |
| 7,400,634 B2 | 7/2008 | Higashitaniguchi et al. | |
| 7,406,092 B2 | 7/2008 | Dropps et al. | |
| 7,436,845 B1 | 10/2008 | Rygh et al. | |
| 7,486,689 B1 | 2/2009 | Mott | |
| 7,525,983 B2 | 4/2009 | Dropps et al. | |
| 7,529,243 B2 | 5/2009 | Sodder et al. | |
| 7,561,571 B1 | 7/2009 | Lovett et al. | |
| 7,564,789 B2 | 7/2009 | Betker | |
| 7,564,869 B2 | 7/2009 | Cafiero et al. | |
| 7,684,326 B2 * | 3/2010 | Nation et al. | 370/230.1 |
| 7,801,125 B2 | 9/2010 | Kreeger et al. | |
| 7,830,793 B2 | 11/2010 | Gai et al. | |
| 2001/0043564 A1 | 11/2001 | Bloch et al. | |
| 2001/0048661 A1 | 12/2001 | Clear et al. | |
| 2002/0046271 A1 | 4/2002 | Huang | |
| 2002/0085493 A1 | 7/2002 | Pekkala et al. | |
| 2002/0085565 A1 | 7/2002 | Ku et al. | |
| 2002/0103631 A1 | 8/2002 | Feldmann et al. | |
| 2002/0141427 A1 | 10/2002 | McAlpine | |
| 2002/0150041 A1 | 10/2002 | Reinschmidt et al. | |
| 2002/0159385 A1 | 10/2002 | Susnow et al. | |
| 2002/0188648 A1 | 12/2002 | Aweya et al. | |
| 2002/0191640 A1 | 12/2002 | Haymes et al. | |
| 2003/0002517 A1 | 1/2003 | Takajitsuko et al. | |
| 2003/0026267 A1 | 2/2003 | Obermann et al. | |
| 2003/0037127 A1 | 2/2003 | Shah et al. | |
| 2003/0037163 A1 | 2/2003 | Kitada et al. | |
| 2003/0061379 A1 | 3/2003 | Craddock et al. | |
| 2003/0084219 A1 | 5/2003 | Yao et al. | |
| 2003/0091037 A1 | 5/2003 | Latif et al. | |
| 2003/0115355 A1 | 6/2003 | Cometto et al. | |
| 2003/0118030 A1 | 6/2003 | Fukuda | |
| 2003/0152034 A1 | 8/2003 | Zhang et al. | |
| 2003/0152063 A1 | 8/2003 | Giese et al. | |
| 2003/0169690 A1 | 9/2003 | Mott | |
| 2003/0193942 A1 | 10/2003 | Gil | |
| 2003/0195983 A1 | 10/2003 | Krause | |
| 2003/0202536 A1 | 10/2003 | Foster et al. | |
| 2003/0223416 A1 | 12/2003 | Rojas et al. | |
| 2003/0225549 A1 | 12/2003 | Shay | |
| 2003/0227893 A1 | 12/2003 | Bajic | |
| 2004/0006705 A1 | 1/2004 | Walker | |
| 2004/0008675 A1 | 1/2004 | Basso et al. | |
| 2004/0013088 A1 | 1/2004 | Gregg | |
| 2004/0013124 A1 | 1/2004 | Peebles et al. | |
| 2004/0024903 A1 | 2/2004 | Costatino et al. | |
| 2004/0032856 A1 | 2/2004 | Sandstrom | |
| 2004/0042448 A1 | 3/2004 | Lebizay et al. | |
| 2004/0042477 A1 * | 3/2004 | Bitar et al. | 370/412 |
| 2004/0076175 A1 | 4/2004 | Patenaude | |
| 2004/0078621 A1 | 4/2004 | Talaugon et al. | |
| 2004/0081203 A1 | 4/2004 | Sodder et al. | |
| 2004/0100980 A1 | 5/2004 | Jacobs et al. | |
| 2004/0120332 A1 | 6/2004 | Hendel | |
| 2004/0156390 A1 | 8/2004 | Prasad et al. | |
| 2004/0196809 A1 * | 10/2004 | Dillinger et al. | 370/331 |
| 2004/0213243 A1 | 10/2004 | Lin et al. | |
| 2004/0240459 A1 | 12/2004 | Lo et al. | |
| 2005/0002329 A1 | 1/2005 | Luft et al. | |
| 2005/0018606 A1 | 1/2005 | Dropps et al. | |
| 2005/0025179 A1 | 2/2005 | McLaggan et al. | |
| 2005/0047421 A1 | 3/2005 | Solomon | |
| 2005/0060445 A1 * | 3/2005 | Beukema et al. | 710/52 |
| 2005/0104217 A1 | 5/2005 | Lehave | |
| 2005/0105474 A1 | 5/2005 | Metzler | |
| 2005/0111487 A1 | 5/2005 | Matta et al. | |
| 2005/0138243 A1 * | 6/2005 | Tierney et al. | 710/52 |
| 2005/0141419 A1 | 6/2005 | Bergamasco et al. | |
| 2005/0141568 A1 | 6/2005 | Kwak et al. | |
| 2005/0152406 A2 | 7/2005 | Chauveau | |
| 2005/0169188 A1 | 8/2005 | Cometto et al. | |
| 2005/0169270 A1 | 8/2005 | Mutuo et al. | |
| 2005/0190752 A1 | 9/2005 | Chiou et al. | |
| 2005/0226149 A1 | 10/2005 | Jacobson et al. | |
| 2005/0238064 A1 | 10/2005 | Winter et al. | |
| 2005/0286436 A1 | 12/2005 | Flask | |
| 2006/0002385 A1 | 1/2006 | Johnsen et al. | |
| 2006/0023708 A1 | 2/2006 | Snively | |
| 2006/0059213 A1 | 3/2006 | Evoy | |
| 2006/0087989 A1 | 4/2006 | Gai et al. | |
| 2006/0098589 A1 | 5/2006 | Kreeger et al. | |
| 2006/0101140 A1 | 5/2006 | Gai et al. | |
| 2006/0104218 A1 | 5/2006 | Kako | |
| 2006/0146832 A1 | 7/2006 | Rampal et al. | |
| 2006/0171318 A1 | 8/2006 | Bergamasco et al. | |
| 2006/0187832 A1 | 8/2006 | Yu | |
| 2006/0187900 A1 | 8/2006 | Akbar | |
| 2006/0198323 A1 | 9/2006 | Finn | |
| 2006/0215550 A1 | 9/2006 | Malhotra | |
| 2006/0251067 A1 | 11/2006 | DeSanti et al. | |
| 2006/0274791 A1 | 12/2006 | Garcia et al. | |
| 2007/0041321 A1 | 2/2007 | Sasaki et al. | |
| 2007/0047443 A1 * | 3/2007 | Desai et al. | 370/235 |
| 2007/0081454 A1 | 4/2007 | Bergamasco et al. | |
| 2007/0115824 A1 | 5/2007 | Chandra et al. | |
| 2007/0121617 A1 | 5/2007 | Kanekar et al. | |
| 2007/0183332 A1 | 8/2007 | Oh et al. | |
| 2008/0019282 A1 | 1/2008 | Alaria et al. | |
| 2008/0069114 A1 | 3/2008 | Shimada et al. | |
| 2008/0089247 A1 | 4/2008 | Sane et al. | |
| 2008/0117938 A1 | 5/2008 | Erich et al. | |
| 2008/0186968 A1 | 8/2008 | Farinacci et al. | |
| 2008/0212595 A1 | 9/2008 | Figueira et al. | |
| 2008/0259798 A1 * | 10/2008 | Loh et al. | 370/235 |
| 2008/0273465 A1 | 11/2008 | Gusat et al. | |
| 2009/0052326 A1 | 2/2009 | Bargamasco et al. | |

| | | | |
|---|---|---|---|
| 2009/0073882 | A1 | 3/2009 | McAlpine et al. |
| 2009/0232138 | A1 | 9/2009 | Gobara et al. |
| 2009/0252038 | A1 | 10/2009 | Cafiero et al. |

FOREIGN PATENT DOCUMENTS

| | | |
|---|---|---|
| EP | 1206099 | 5/2002 |
| WO | WO2004/064324 | 7/2004 |
| WO | WO 2006/047092 | 5/2006 |
| WO | WO 2006/047109 | 5/2006 |
| WO | WO 2006/047194 | 5/2006 |
| WO | WO 2006/047223 | 5/2006 |
| WO | WO 2006/057730 | 6/2006 |
| WO | WO 2006/063922 | 6/2006 |
| WO | WO 2007/050250 | 5/2007 |

OTHER PUBLICATIONS

A.K. Choudhury, E.L. Hahne, "Dynamic Queue Length Thresholds for Shared-Memory Packet Switches", IEEE/ACM Transactions on Networking, Apr. 1998.

A.K. Choudhury, E.L. Hahne, "A New Buffer Management Scheme for Hierarchical Shared Memory Switches", IEEE/ACM Transactions on Networking, 26 pp., 1997.

S. Floyd, V. Jacobson, "Random Early Detection Gateways for Congestion Avoidance," Transactions on Networking, Aug. 1993.

K. Ramakrishnan et al., RFC 3168, "The Addition of Explicit Congestion Notification (ECN) to IP" Sep. 2001.

J. Mahdavi, et al., "IPPM Metrics for Measuring Connectivity," RFC 2678, pp. 1-9, Sep. 1999.

J. Postel, "Internet Control Message Protocol, DARPA Internet Program Protocol Specification," RFC 792, pp. 1-15, Sep. 1981.

U.S. Appl. No. 10/777,886, entitled "End-to-End Congestion Control in a Fibre Channel Network", filed Feb. 11, 2004.

U.S. Appl. No. 11/490,806, entitled "Methods and Apparatus for Improved Determination of Network Metrics", filed Jul. 20, 2006.

IEEE Standards 802.3™—2002, IEEE Computer Society, Mar. 8, 2002, 1538 pages.

MAC Control PAUSE Operation, 31B.3.1 Transmit Operation, Annex 31B, IEEE Std 802.3ae-2002, 4 pages.

IEEE Standards 802.3ah™—2004, IEEE Computer Society, Sep. 7, 2004, 623 pages.

MAC Control PAUSE Operation, 31B.1 PAUSE description, Annex 31B, IEEE Std 802.3, 1998 Edition, 11 pages.

IEEE Standards 802.3ak™—2004, IEEE Computer Society, Mar. 1, 2004, 52 pages.

31. MAC Control, IEEE Std 802.3-2002, Section Two, 9 pages.

Mekkittikul et al., A Practical Scheduling Algorithm to Achieve 100% Throughput in Input-Queued Switches, Computer Systems Laboratory, Stanford University, 1998, 8 pages.

J. Moy, OSPF Version 2 (RFC 2178), Network Working Group, Cascade Communications Corp., Jul. 1997, 211 pp.

Floyd et al., Random Early Detection Gateways for Congestion Avoidance, Lawrence Berkeley Laboratory, Univ. of California, IEEE/ACM Transactions on Networking, Aug. 1993, 22 pages.

K. Ramakrishnan et al., "The Addition of Explicit Congestion Notification (ECN) to IP," RFC 3168, Sep. 2001.

InfiniBand Arch, Spec, vol. 1. Oct. 24, 2000 Final. Infiniband SM Trade Association.

InfiniBand Arch, Spec, vol. 2. Oct. 24, 2000 Final. Infiniband SM Trade Association.

Cisco Systems, Inc., "Cisco data Center Network Architecture and Solutions Overview," http://www.cisco.com/application/pdf/en/us/guest/netsol/ns377/c643_/cdccont_0900aecd802c9a4f.pdf, 2006.

Sancho et al.; "Analyzing the Influence of Virtual Lanes on the Performance on Infiniband Networks"; 2002; IEEE Proceeding of the International Parallel and Disctributed processing Symposium (IPDPS'02); pp. 1-10.

International Search Report and Written Opinion, dated Sep. 21, 2006, from PCT/US05/37069.

International Search Report and Written Opinion, dated Oct. 16, 2006, from PCT/US05/37765.

International Search Report and Written Opinion, dated Nov. 1, 2006, from PCT/US05/36700.

International Search Report and Written Opinion, dated Jan. 16, 2007, from PCT/US05/37239.

International Search Report and Written Opinion, dated Feb. 7, 2008, from PCT/US07/015506.

International Search Report and Written Opinion, dated Feb. 20, 2007, from PCT/US05/37651.

International Search Report and Written Opinion, dated Sep. 27, 2007, from PCT/US06/38858.

International Search Report and Written Opinion, dated May 23, 2008, from PCT/US08/051986.

International Search Report and Written Opinion, dated Jun. 4, 2008, PCT/US2007/066027.

International Search Report and Written Opinion, dated Oct. 15, 2008, from PCT/US08/069154.

CN Office Action mailed Jul. 18, 2008, in Chinese Application No. 200580034646.0.

CN Office Action mailed Aug. 8, 2008, in Chinese Application No. 200580035946.

CN Second Office Action mailed Feb. 27, 2009, in Chinese Application No. 200580035946.

CN Office Action mailed Apr. 3, 2009, in Chinese Application No. 200680032204.

CN Office Action mailed Jul. 31, 2009, in Chinese Application No. 200580034647.5.

CN Second Office Action mailed Jan. 15, 2010, in Chinese Application No. 200580034646.0.

CN Second Office Action mailed Feb. 5, 2010, in Chinese Application No. 200580034647.5.

EPO Extended Search Report mailed Jul. 16, 2009, in EP Application No. 05810244.3.

EPO Office Action mailed Oct. 1, 2009, in EP Application No. 05810244.3.

EPO Extended Search Report mailed Jul. 13, 2009, in EP Application No. 05810800.2.

EPO Office Action mailed Oct. 19, 2009, in EP Application No. 05810800.2.

U.S. Appl. No. 10/777,886, entitled "End-to-End Congestion Control", filed Feb. 11, 2004.

U.S. Appl. No. 60/621,396, filed Oct. 22, 2004.

US Office Action mailed Jan. 24, 2008 in related U.S. Appl. No. 11/152,991.

US Office Action mailed Jan. 30, 2008 in related U.S. Appl. No. 11/078,992.

US Office Action mailed Feb. 21, 2008 in related U.S. Appl. No. 11/094,877.

US Office Action mailed Mar. 31, 2008 in related U.S. Appl. No. 11/084,587.

US Office Action mailed May 29, 2008 in related U.S. Appl. No. 11/155,388.

US Office Action mailed Jul. 3, 2008 in related U.S. Appl. No. 11/400,671.

US Final Office Action mailed Jul. 11, 2008 in related U.S. Appl. No. 11/078,992.

US Office Action mailed Jul. 28, 2008 in related U.S. Appl. No. 11/094,877.

US Final Office Action mailed Sep. 8, 2008 in related U.S. Appl. No. 11/152,991.

US Final Office Action mailed Sep. 15, 2008 in related U.S. Appl. No. 11/155,388.

US Office Action mailed Oct. 23, 2008 in related U.S. Appl. No. 11/078,992.

US Office Action mailed Oct. 28, 2008 in related U.S. Appl. No. 11/084,587.

US Final Office Action mailed Dec. 10, 2008 in related U.S. Appl. No. 11/094,877.

US Office Action mailed Feb. 18, 2009 in related U.S. Appl. No. 11/490,806.

US Office Action mailed Mar. 4, 2009 in related U.S. Appl. No. 11/152,991.

US Final Office Action mailed Mar. 17, 2009 in related U.S. Appl. No. 11/400,671.

US Notice of Allowance mailed Mar. 23, 2009 in related U.S. Appl. No. 11/078,992.

US Office Action mailed Apr. 7, 2009 in related U.S. Appl. No. 11/094,877.
US Office Action mailed Apr. 15, 2009 in related U.S. Appl. No. 11/670,544.
US Office Action mailed Apr. 22, 2009 in related U.S. Appl. No. 11/084,587.
US Office Action mailed May 14, 2009 in related U.S. Appl. No. 11/248,933.
US Notice of Allowance mailed May 29, 2009 in related U.S. Appl. No. 11/155,388.
US Final Office Action mailed Jun. 17, 2009 in related U.S. Appl. No. 11/490,806.
US Office Action mailed Jun. 22, 2009 in related U.S. Appl. No. 11/400,671.
US Notice of Allowance mailed Jul. 19, 2009 in related U.S. Appl. No. 11/155,388.
US Final Office Action mailed Aug. 18, 2009 in related U.S. Appl. No. 11/152,991.
US Office Action mailed Oct. 19, 2009 in related U.S. Appl. No. 11/842,866.
US Final Office Action mailed Oct. 22, 2009 in related U.S. Appl. No. 11/670,544.
US Office Action mailed Nov. 12, 2009 in related U.S. Appl. No. 11/490,806.
US Office Action mailed Nov. 4, 2009 in related U.S. Appl. No. 11/094,877.
US Office Action mailed Nov. 23, 2009 in related U.S. Appl. No. 11/084,587.
US Office Action mailed Dec. 9, 2009 in related U.S. Appl. No. 11/400,671.
US Final Office Action mailed Dec. 28, 2009 in related U.S. Appl. No. 11/248,933.
US Notice of Allowance mailed Dec. 31, 2009 in related U.S. Appl. No. 11/152,991.
US Final Office Action mailed Mar. 17, 2010 in related U.S. Appl. No. 11/490,806.
Wei Cao Huawei Technologies: "IEEE 802.1ah Mode for Ethernet Over MPLS; draft-cao-pwe3-801-1ah-00.txt" IETF Standard-Working-Draft, Internet Engineering Task Force, IETF, CH, Oct. 16, 2006, XP015047518 ISSN: 000-0004.
CN Office Action mailed Feb. 12, 2010, in Chinese Application No. 200580034955.8.
EPO Search Report mailed Mar. 19, 2010, in EP Application No. 08728248.9.
EPO Office Action mailed Jun. 18, 2010, in EP Application No. 08728248.9.
US Office Action mailed Jun. 24, 2010 in related U.S. Appl. No. 11/084,587.
US Final Office Action mailed Jun. 11, 2010 in related U.S. Appl. No. 11/400,671.
US Notice of Allowance mailed Apr. 23, 2010 in related U.S. Appl. No. 11/094,877.
US Notice of Allowance mailed Jun. 28, 2010 in related U.S. Appl. No. 11/094,877.
US Notice of Allowance mailed May 17, 2010 in related U.S. Appl. No. 11/152,991.
US Office Action mailed May 13, 2010 in related U.S. Appl. No. 11/248,933.
US Non-Final Office Action mailed Jul. 22, 2010 in related U.S. Appl. No. 11/490,806.
US Final Office Action mailed Apr. 2, 2010 in related U.S. Appl. No. 11/842,866.
CN Third Office Action mailed Aug. 11, 2010, in Chinese Application No. 200580034647.5.
CN Fourth Office Action mailed Jan. 10, 2011, in Chinese Application No. 200580034647.5.
CN Second Office Action mailed Aug. 11, 2010, in Chinese Application No. 200580034955.8.
CN Third Office Action mailed Dec. 3, 2010, in Chinese Application No. 200580034955.8.
US Final Office Action mailed Nov. 26, 2010 in related U.S. Appl. No. 11/084,587.
US Notice of Allowance mailed Feb. 4, 2011, in related U.S. Appl. No. 11/248,933.
US Final Office Action mailed Dec. 16, 2010 in related U.S. Appl. No. 11/490,806.
US Office Action mailed Oct. 29, 2010 in related U.S. Appl. No. 11/842,866.
CN Third Office Action mailed Jul. 6, 2011, in Chinese Application No. 200580034646.0.
EPO Extended Search Report mailed Jun. 1, 2011 in EP Application No. 05812799.4.
EPO Office Action mailed Apr. 12, 2011, in EP Application No. 05810244.3.
U.S. Appl. No. 13/112,824, entitled "Ethernet Extension for the Data Center", filed May 20, 2011.
US Office Action mailed Mar. 17, 2011 in related U.S. Appl. No. 11/400,671.
US Office Action mailed Apr. 13, 2011 in related U.S. Appl. No. 12/485,337.
US Office Action mailed May 27, 2011 in related U.S. Appl. No. 11/842,866.

* cited by examiner

FLEXIBLE AND HIERARCHICAL DYNAMIC BUFFER ALLOCATION

BACKGROUND OF THE INVENTION

In many networking implementations a high-speed packet buffer is used to store packets during periods of congestion. Usually this buffer is very small because it is implemented on-chip. Being a scarce and expensive resource, it is important to maximize the use of such buffers. It would be very desirable to implement methods and devices that address at least some of the shortcomings of the prior art.

DESCRIPTION OF EXAMPLE EMBODIMENTS

Overview

Figure 1:
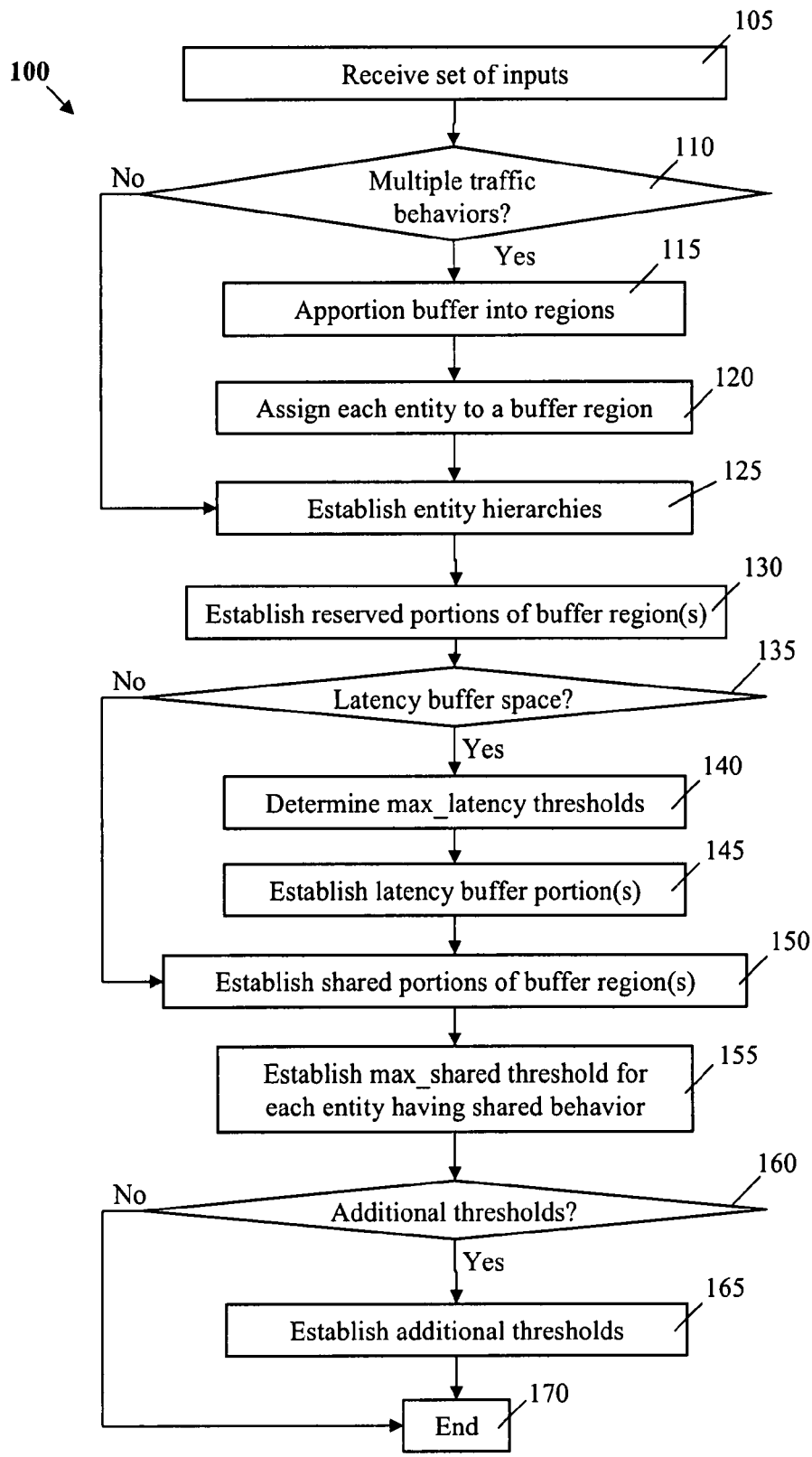
FIG. 1 is a flow chart that outlines some methods for establishing a buffer allocation scheme.

Some implementations provide a method that involves the following steps: receiving a first set of inputs comprising a first plurality of entities and a first traffic behavior; determining a first region of a buffer corresponding to the first traffic behavior; assigning the first plurality of entities to the first region; determining hierarchical relationships between at least some of the first plurality of entities; determining a first shared buffer space of the first region; and assigning at least one threshold for each of the first plurality of entities. The threshold may comprise a maximum amount of the first shared buffer space that may be allocated to an entity. The method may also involve configuring a logic device to allocate the first shared buffer space dynamically according to the hierarchical relationships and the thresholds.

Example Embodiments

Reference will now be made in detail to some specific examples of the invention, including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well-known process operations have not been described in detail in order not to obscure unnecessarily the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted.

Similarly, the steps of the methods shown and described herein are not necessarily all performed (and in some implementations are not performed) in the order indicated. Moreover, some implementations of the methods discussed herein may include more or fewer steps than those shown or described.

Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, an indicated connection does not necessarily mean a direct, unimpeded connection unless otherwise noted.

Some examples of establishing buffer allocation schemes will be described with reference to FIG. 1. The steps of method 100 may be performed, for example, according to software embodied in a machine-readable medium and used for coding a programmable logic device such as an application-specific integrated circuit ("ASIC") or a field-programmable gate array ("FPGA"). In step 105, the program receives a set of inputs. The inputs may include, for example, a set of traffic behaviors, a set of entities, a set of entity properties, a set of entity behaviors, a set of threshold behaviors, etc.

An entity may be a physical entity, such as a port or a physical interface. An entity may also be a logical entity, such as a virtual lane, a virtual output queue ("VOQ") or a priority such as class of service ("CoS") or quality of service ("QoS").

Traffic behaviors can be simple or more complex, depending on the desired implementation. Examples include no drop, no drop with Backward Congestion Notification ("BCN"), drop with tail drop parameters specified, drop with BCN and per class flow control, drop with BCN, drop with AFD (Approximate Fair Dropping), etc. Many terms used herein, including but not limited to terms involving traffic behaviors, pertain to Data Center Ethernet ("DCE") functionality.

A brief overview of some DCE concepts is provided in the following paragraphs. More detail regarding DCE may be found in United States Patent Application Publication No. 2006/0251067, entitled "FIBRE CHANNEL OVER ETHERNET", which is hereby incorporated by reference. Methods and devices for managing network traffic, particularly in the DCE context, are described in United States Patent Application Publication No. 2006/0171318, entitled "ACTIVE QUEUE MANAGEMENT METHODS AND DEVICES" and in United States Patent Application Publication No. 2007/0081454, entitled "METHODS AND DEVICES FOR BACKWARD CONGESTION NOTIFICATION," which are hereby incorporated by reference.

Figure 2:
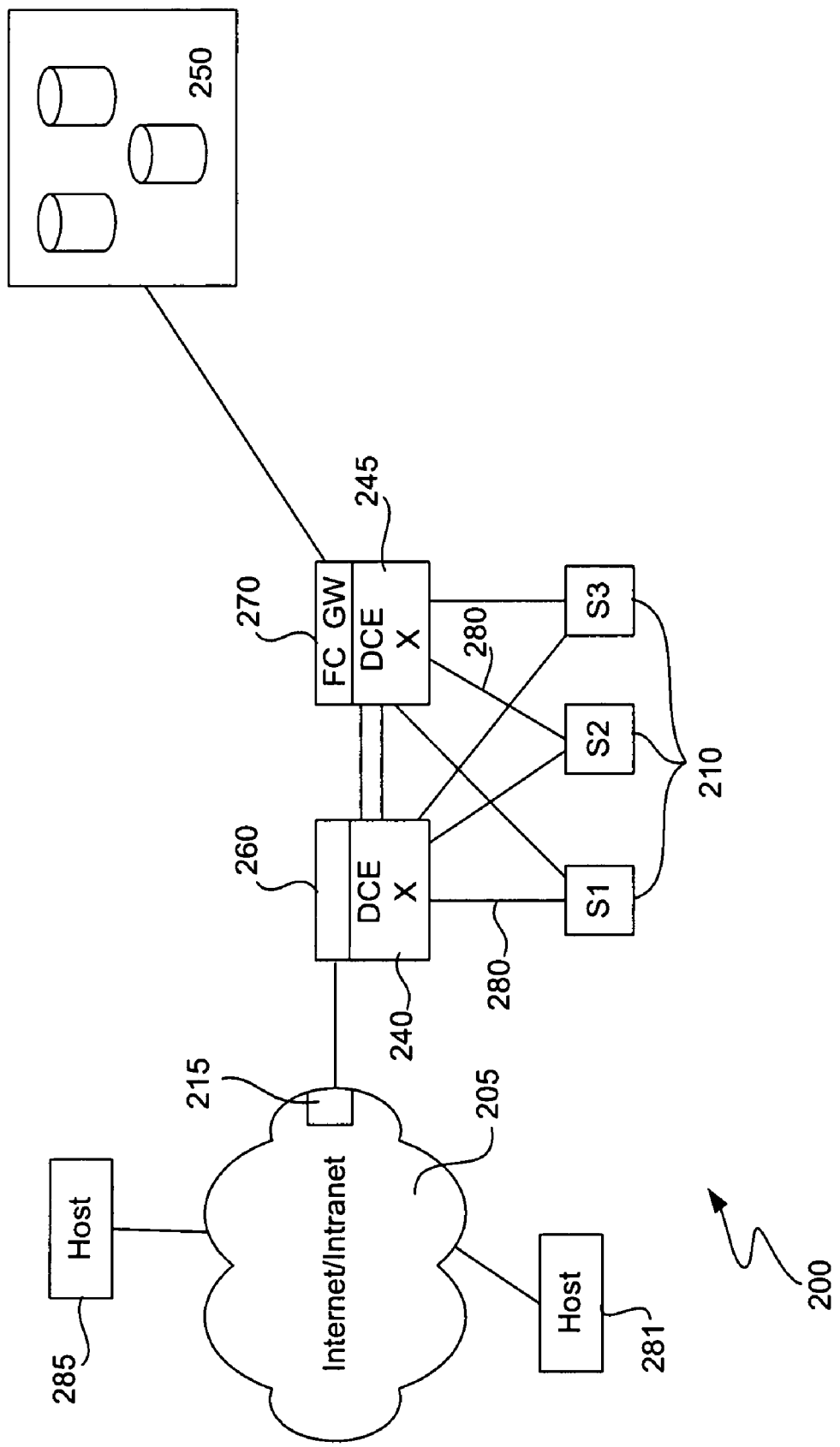
FIG. 2 is a simplified version of a network that includes Data Center Ethernet ("DCE") devices.

FIG. 2 is a simplified network diagram that illustrates one example of a DCE solution for simplifying the connectivity of data center 200. Data center 200 includes DCE switch 240, having router 260 for connectivity with TCP/IP network 205 and host devices 280 and 285 via firewall 215. Some examples of DCE switches are set forth in detail herein. Preferably, the DCE switches of the present invention can run 10 Gb/s Ethernet and have relatively small frame buffers. Some preferred DCE switches support only layer 2 functionality.

Although DCE switches of the present invention can be implemented using fiber optics and optical transceivers, some preferred DCE switches are implemented using copper connectivity to reduce costs. Some such implementations are implemented according to the proposed IEEE 802.3ak standard called 10Base-CX4, which is hereby incorporated by reference for all purposes. The inventors expect that other implementations will use the emerging standard IEEE P802.3an (10GBASE-T), which is also incorporated by reference for all purposes.

Servers 210 are also connected with DCE switch 245, which includes FC gateway 270 for communication with disk arrays 250. FC gateway 270 implements FC over Ethernet, thereby eliminating the need for separate FC and Ethernet networks within data center 200. Gateway 270 could be a device such as Cisco Systems' MDS 9000 IP Storage Service Module that has been configured with software for performing some methods of the present invention. Ethernet traffic is carried within data center 200 as native format. This is possible because DCE is an extension to Ethernet that can carry FC over Ethernet and RDMA in addition to native Ethernet.

Figure 3:
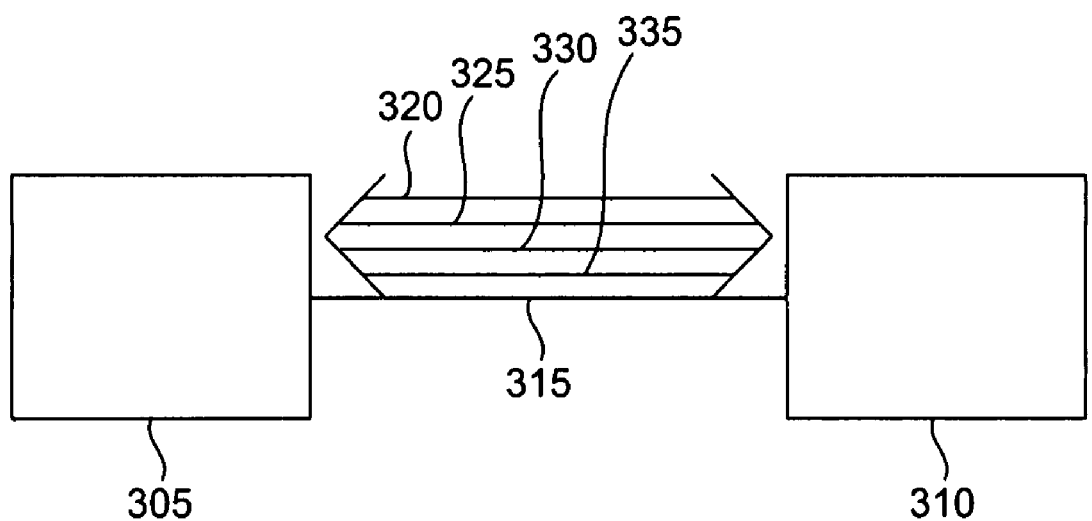
FIG. 3 illustrates two switches connected by a physical link and used to implement virtual lanes.

FIG. 3 illustrates two switches 305 and 310 connected by a physical link 315. The behavior of switches 305 and 310 is generally governed by IEEE 802.1 and the behavior of physical link 315 is generally governed by IEEE 802.3. In general, the present invention provides for two general behaviors of DCE switches, plus a range of intermediate behaviors. The first general behavior is "drop" behavior, which is similar to that of an Ethernet. A second general behavior is "no drop" behavior, which is similar to that of FC. Intermediate behaviors between "drop" and "no drop" behaviors, including but not limited to the "delayed drop" behavior described elsewhere herein, are also provided by the present invention.

In order to implement both behaviors on the same physical link 315, DCE involves methods and devices for implementing "virtual lanes," also referred to herein as "VLs." VLs allow a physical link to be divided into multiple logical entities such that traffic in one of the VLs is unaffected by the traffic on other VLs. This may be done by maintaining separate buffers (or separate portions of a physical buffer) for each VL. For example, it is possible to use one VL to transmit control plane traffic and some other high priority traffic without being blocked because of low priority bulk traffic on another VL. VLANs may be grouped into different VLs such that traffic in one set of VLANs can proceed unimpeded by traffic on other VLANs.

In the example illustrated by FIG. 3, switches 305 and 310 are effectively providing 4 VLs across physical link 315. Here, VLs 320 and 325 are drop VLs and VLs 330 and 335 are no drop VLs. In order to simultaneously implement both "drop" behavior and "no drop" behavior, there must be at least one VL assigned for each type of behavior, for a total of 2. (It is theoretically possible to have only one VL that is temporarily assigned to each type of behavior, but such an implementation is not desirable.) To support legacy devices and/or other devices lacking DCE functionality, some implementations of DCE may support a link with no VL and map all the traffic of that link into a single VL at the first DCE port. From a network management perspective, it is preferable to have between 2 and 16 VLs, though more could be implemented.

It is preferable to dynamically partition the link into VLs, because static partitioning is less flexible. In some preferred implementations of the invention, dynamic partitioning is accomplished on a packet-by-packet basis (or a frame-by-frame basis), e.g., by adding an extension header or using specific fields of the frame header. For example, some implementations are based on the IEEE 802.1Q format. The present invention encompasses a wide variety of formats for such a header. In some implementations of the invention, there are two types of frames sent on a DCE link: these types are data frames and link management frames.

Figure 4:
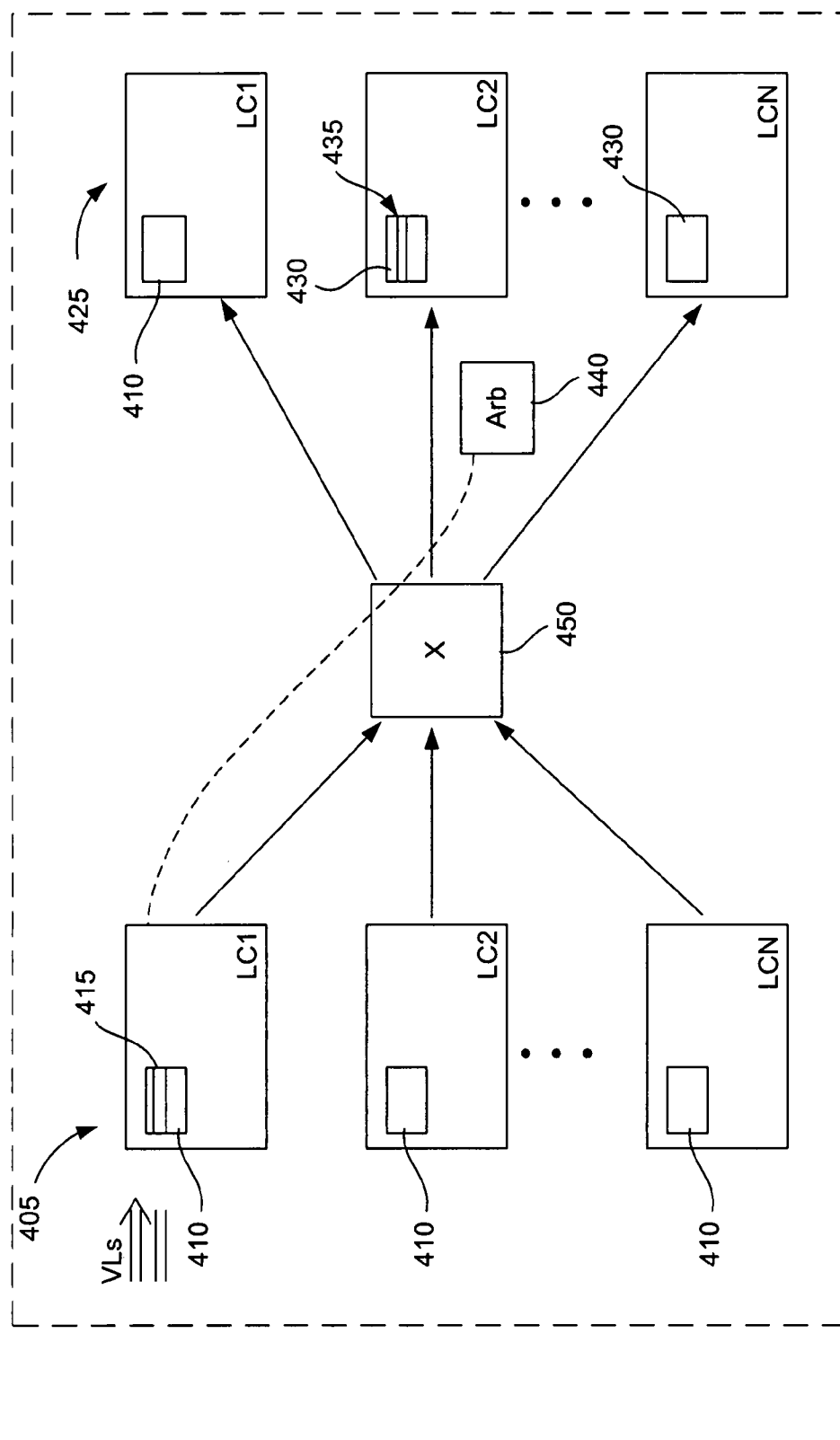
FIG. 4 illustrates a simplified architecture of a DCE switch.

FIG. 4 is a schematic diagram that illustrates a simplified architecture of DCE switch 400. DCE switch 400 includes N line cards, each of which characterized by and ingress side (or input) 405 and an egress side (or output) 425. Line card ingress sides 405 are connected via switching fabric 450, which includes a crossbar in this example, to line card egress sides 425.

In this implementation, buffering is performed on both the input and output sides. Other architectures are possible, e.g., those having input buffers, output buffers and shared memory. Accordingly, each of input line cards 405 includes at least one buffer 410 and each of output line cards 425 includes at least one buffer 430, which may be any convenient type of buffer known in the art, e.g., an external DRAM-based buffer or an on-chip SRAM-based buffer. The buffers 410 are used for input buffering, e.g., to temporarily retain packets while awaiting sufficient buffer to become available at the output line card to store the packets to be sent across switching fabric 450. Buffers 430 are used for output buffering, e.g., to temporarily retain packets received from one or more of the input line cards 405 while awaiting sufficient credits for the packets to be transmitted to another DCE switch.

It is worthwhile noting that while credits may be used internally to a switch and also externally, there is not necessarily a one-to-one mapping between internal and external credits. Moreover, it is possible to use PAUSE frame either internally or externally. For example, any of the four possible combinations PAUSE-PAUSE, PAUSE-CREDITS, CREDITS-PAUSE and CREDIT-CREDIT may produce viable solutions.

DCE switch 400 includes some form of credit mechanism for exerting flow control. This flow control mechanism can exert back pressure on buffers 410 when an output queue of one of buffers 430 has reached its maximum capacity. For example, prior to sending a frame, one of the input line cards 405 may request a credit from arbiter 440 (which may be, e.g., a separate chip located at a central location or a set of chips distributed across the output linecards) prior to sending a frame from input queue 415 to output queue 435. Preferably, the request indicates the size of the frame, e.g., according to the frame credit field of the DCE header. Arbiter 440 will determine whether output queue 435 can accept the frame (i.e., output buffer 430 has enough space to accommodate the frame). If so, the credit request will be granted and arbiter 440 will send a credit grant to input queue 415. However, if output queue 435 is too full, the request will be denied and no credits will be sent to input queue 415.

DCE switch 400 needs to be able to support both the "drop" and "no drop" behavior required for virtual lanes, as discussed elsewhere herein. The "no drop" functionality is enabled, in part, by applying internally to the DCE switch some type of credit mechanism like the one described above. Externally, the "no drop" functionality can be implemented in accordance with the buffer-to-buffer credit mechanism described earlier or PAUSE frames. For example, if one of input line cards 405 is experiencing back pressure from one or more output line cards 425 through the internal credit mechanism, the line card can propagate that back pressure externally in an upstream direction via a buffer-to-buffer credit system like that of FC.

Preferably, the same chip (e.g., the same ASIC) that is providing "no drop" functionality will also provide "drop" functionality like that of a classical Ethernet switch. Although these tasks could be apportioned between different chips, providing both drop and no drop functionality on the same chip allows DCE switches to be provided at a substantially lower price.

Each DCE packet will contain information, e.g., in the DCE header, indicating the virtual lane to which the DCE packet belongs. DCE switch 400 will handle each DCE packet according to whether the VL to which the DCE packet is assigned is a drop or a no drop VL.

In addition to the DCE context, the present invention may be implemented in a variety of other contexts, including but not limited to Fibre Channel ("FC") and Ethernet. Broadly speaking, FC would be considered a "no drop" protocol and Ethernet would be considered a "drop" protocol. Even within the FC and Ethernet contexts, many permutations of traffic behavior may be used, e.g., for flow control, to implement fairness, etc.

Returning now to FIG. 1, in step 110 it is determined whether multiple traffic behaviors will be supported. If so, the buffer may be apportioned into buffer regions. (Step 115.) Such apportionment may be desirable in order to separate incompatible traffic behaviors and group compatible traffic behaviors. For example, if both drop and no-drop traffic behaviors will be implemented, some implementations will apportion buffer into separate "drop" and "no drop" buffer regions. Each entity would be assigned to the appropriate buffer region. (Step 120.)

Such apportionment can provide various advantages. For example, apportioning a buffer into separate "drop" and "no drop" buffer regions avoids the challenges involved with having, e.g., a drop portion of the buffer competing with a no-drop portion over a shared buffer space. Such apportionment allows compatible fairness rules to be established and thresholds to be set in a global manner within each buffer region. However, as will be explained in more detail below, it is not always the case that an entity is associated with only one type of traffic behavior. A port, for example, is an entity that may be used to implement only one type of traffic behavior (e.g., in a simple Ethernet context) or several types of traffic behavior (e.g., in a DCE context). Therefore, the same entity may sometimes be mapped to more than one buffer region. In the DCE context, for example, the same port may be mapped to a drop buffer region and a no drop buffer region.

Figure 5:
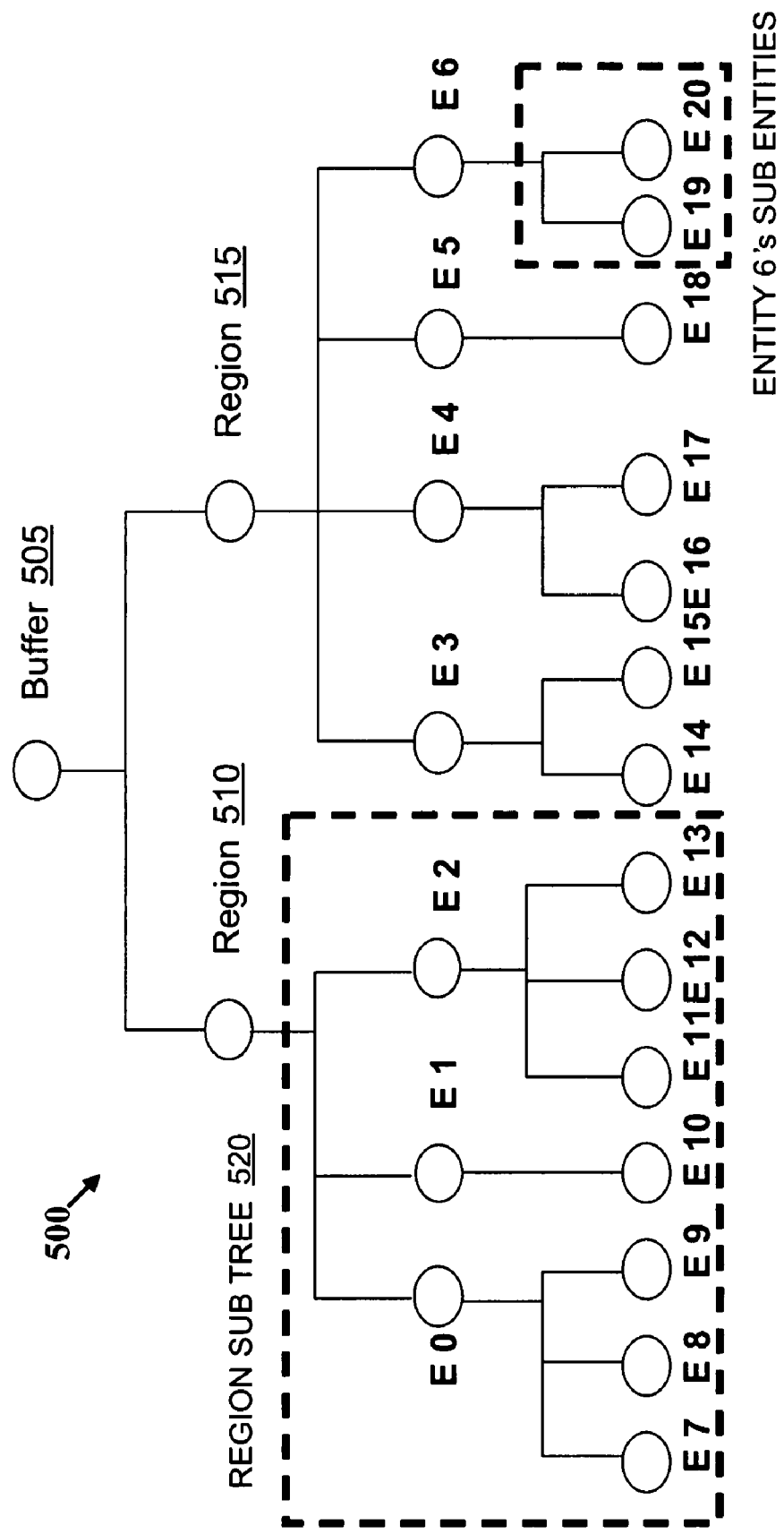
FIG. 5 is a "tree" diagram depicting an example of a hierarchical buffer allocation scheme.

Some implementations, as here, may implement a hierarchical buffer allocation scheme. If so, entity hierarchies will be established. (Step 125.) For example, referring to tree diagram 500 of FIG. 5, buffer 505 has been apportioned into region 510 and region 515. Region sub tree 520 includes entities E0, E1 and E2, as well as entities E7 through E13. Entities E7 through E20 may also be referred to as sub-entities, because they are associated with, but at a lower level than, another entity. Here, for example, E19 and E20 are sub-entities of entity E6. As described in more detail below, buffer space may be shared by entities at the same level of a hierarchy, e.g., shared between entities E3, E4, E5 and E6. Alternatively, dedicated buffer space may be allocated to each of entities E3, E4, E5 and E6. Buffer space allocated to an entity is shared by associated sub-entities, if any, in a hierarchical fashion. Here, for example, entities E19 and E20 will share buffer space allocated to entity E6.

Buffer regions preferably include reserved portions, as established in step 130 in this example, in order to provide at least a minimum amount of buffer space for each entity. The amount of buffer space reserved may or may not be the same for each entity at a particular level of a hierarchy. If an entity has child nodes, the amount of buffer space reserved for an entity may be determined by the sum of the amounts of buffer space reserved for each child node.

It may be desirable to establish latency buffer space, which is a buffer space dedicated to flow control. For buffer regions used to support a flow control mechanism, it is often desirable to have a specific portion of the buffer reserved for packets in transit because it takes a certain amount of time for a source to receive and react to a flow control indication. In the meantime, there are packets coming in. No-drop regions, for example, should have a latency buffer space large enough to ensure that no packets are dropped.

Therefore, in step 135 it is determined whether it would be desirable to establish a latency buffer portion for a buffer region. This determination may involve several factors, including but not limited to a determination of whether a region will be a drop or a no drop region: in the latter case, latency buffer space should be established. However, as described below with reference to FIG. 8, in some instances it will be desirable to establish latency buffer space for certain types of drop buffer regions.

If it is determined in step 135 that it would be desirable to establish latency buffer space for a buffer region, the space is established. In this example, a max_latency threshold, which is the maximum amount of latency buffer, is first established for each entity in the region that requires a latency buffer. (Step 140.) The entire latency buffer portion of the region may then be determined. (Step 145.)

Preferably, shared portions are established in buffer regions. (Step 150.) In this example, the shared portion of each buffer region is the portion remaining after subtracting the reserved portion and the latency portion, if any. Here, a max_shared threshold is established for each entity that will share buffer space with other entities at the same level. (Step 155.) Such behavior will sometimes be referred to herein as "shared behavior." As discussed in further detail below, the max_shared threshold may be established as a constant or as a variable. If the max_shared threshold is established as a constant, this will be referred to herein as "static" shared behavior (or the like). If the max_shared threshold is established as a variable, this will be referred to herein as "adaptive" shared behavior (or the like). In either case, shared behavior involves dynamic processes, wherein the instantaneous amount of buffer that an entity is using may change over time.

In some implementations, an adaptive max_shared threshold can be updated, e.g., based on the activity level of entities sharing the buffer space. For example, an adaptive max_shared threshold may be updated according to, e.g., the number of active entities at a particular level of the hierarchy at a particular time. Alternatively, an adaptive max_shared threshold may be updated according to an average number of active entities at a particular level of the hierarchy during a period of time.

In some implementations, an adaptive max_shared threshold may be updated according to a weighted number of active entities. For example, if entity A and entity B are at the same level of a hierarchy, a weighting function may be used to cause entity A's max_shared threshold to be N times larger than the max_shared threshold of entity B, given the same amount of activity. This may be desirable, for example, if one wants to assign more buffer space to an entity having a relatively higher class of service ("CoS") than to an entity having a relatively lower CoS.

In step 160, it is determined whether additional thresholds should be defined for at least some entities. If so, the thresholds are established in step 165. For example, thresholds may be defined for asserting and de-asserting flow control, for implementing BCN, etc. The process ends in step 170.

Further examples of establishing buffer allocation schemes will now be described with reference to FIGS. 6 through 8. In the first such example, a buffer allocation scheme is established for a device having 24 ports. The desired implementation will have 8 virtual lanes established for each port. Virtual lanes 0-3 will be supporting no drop traffic behavior, with BCN. Virtual lanes 4-7 will have drop traffic behavior, with no pause.

Figure 6:
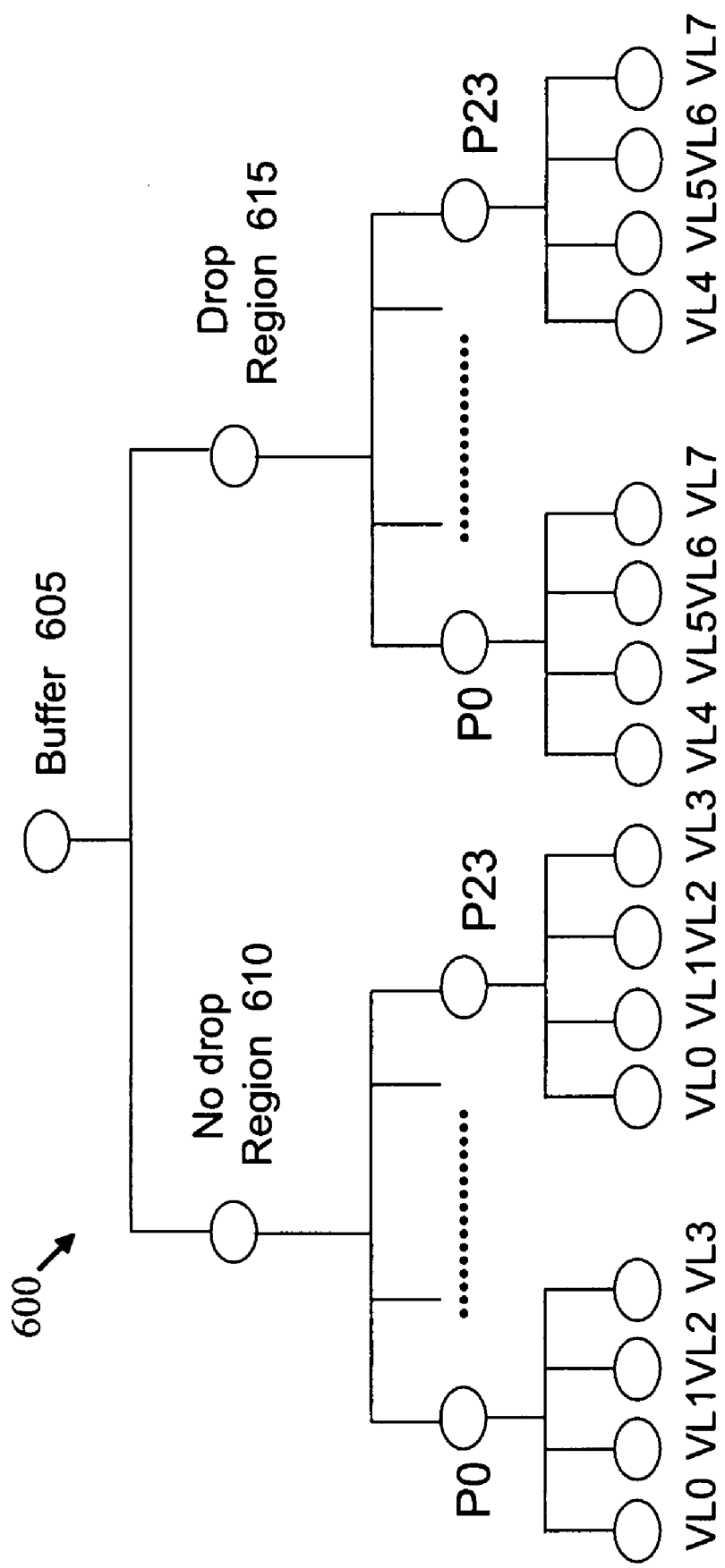
FIG. 6 is a "tree" diagram depicting another example of a hierarchical buffer allocation scheme.

Tree diagram 600 of FIG. 6 depicts a hierarchy of entities according to this example. Ports P0 through P23 are assigned both to no drop region 610 and drop region 615, because in this example the same physical entities (ports) will be used to implement two different traffic behaviors. However, virtual lanes V0 through VL3 are assigned only to no drop region 610. Similarly, virtual lanes V4 through VL7 are assigned only to drop region 615.

Figure 7:
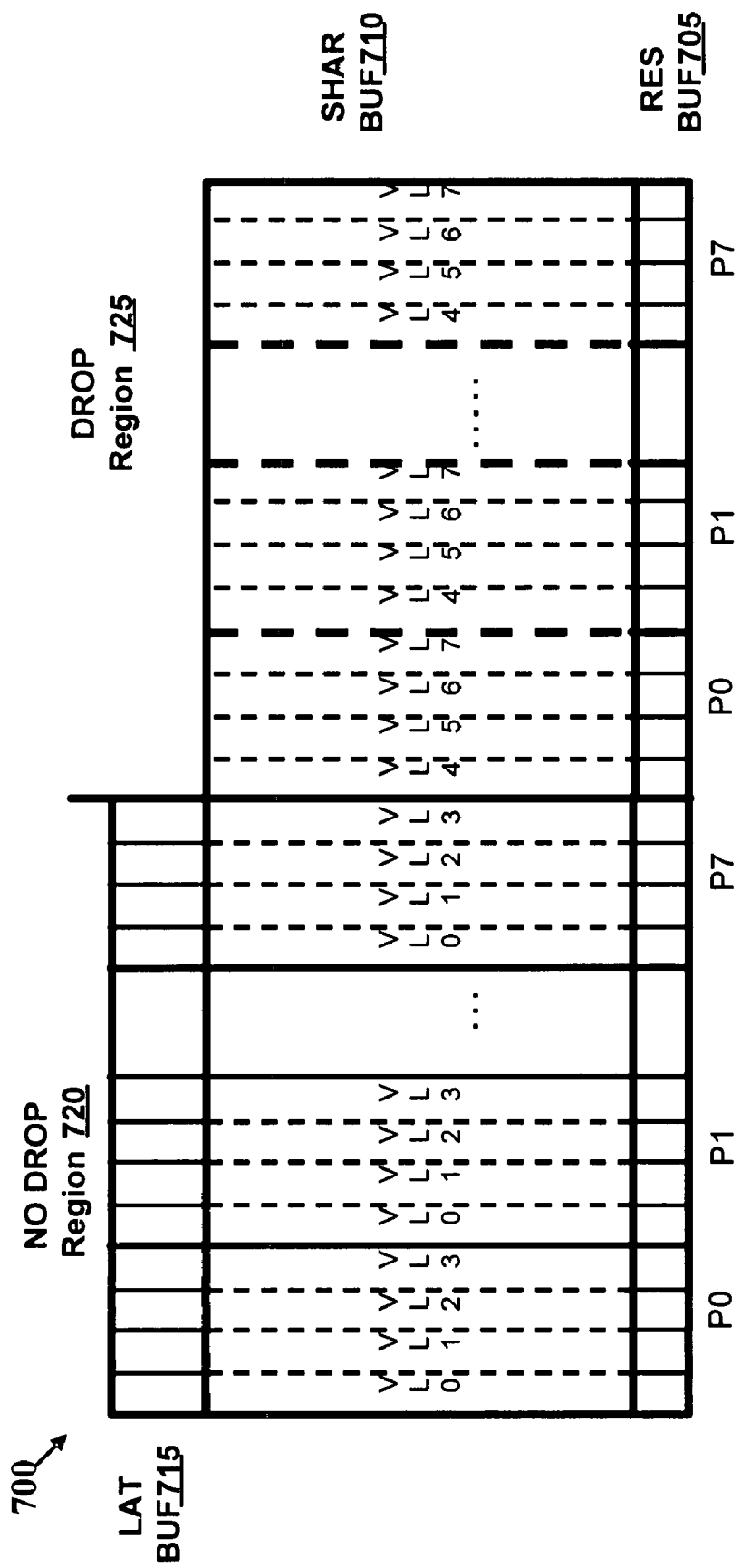
FIG. 7 illustrates how regions of a buffer may be apportioned according to one buffer allocation scheme.

Similar regions of a buffer 700 are indicated in FIG. 7. Here, at least a portion of reserved buffer space 705 is dedicated to each entity. All entities can also share a portion of shared buffer space 710. In no drop region 720, at least a portion of latency buffer space 715 is dedicated to each entity, in order to avoid dropping packets that may be sent before a source can receive a PAUSE notification.

However, not all entities share buffer space 710 in the same manner. In FIG. 7, "shared" entity behaviors are indicated by a dashed separating line and "dedicated" entity behaviors are indicated by solid lines. Accordingly, in no drop region 720, virtual lanes VL0 through VL3 may share a fixed portion of shared buffer 710 that is dedicated to each of ports P0 through P7. For example, virtual lanes VL0 through VL3 may be dynamically assigned amounts of buffer space that change according to their relative activity, weighting functions, etc. However, within no drop region 720, ports P0 through P7 do not share buffer space with one another.

In drop region 725, virtual lanes VL4 through VL7 may share portions of shared buffer 710 that is allocated to ports P0 through P7. Moreover, ports P0 through P7 can share portions of shared buffer 710 with one another. For example, ports P0 through P7 may be adaptively assigned buffer space according to the relative activity of their associated virtual lanes.

Figure 8:
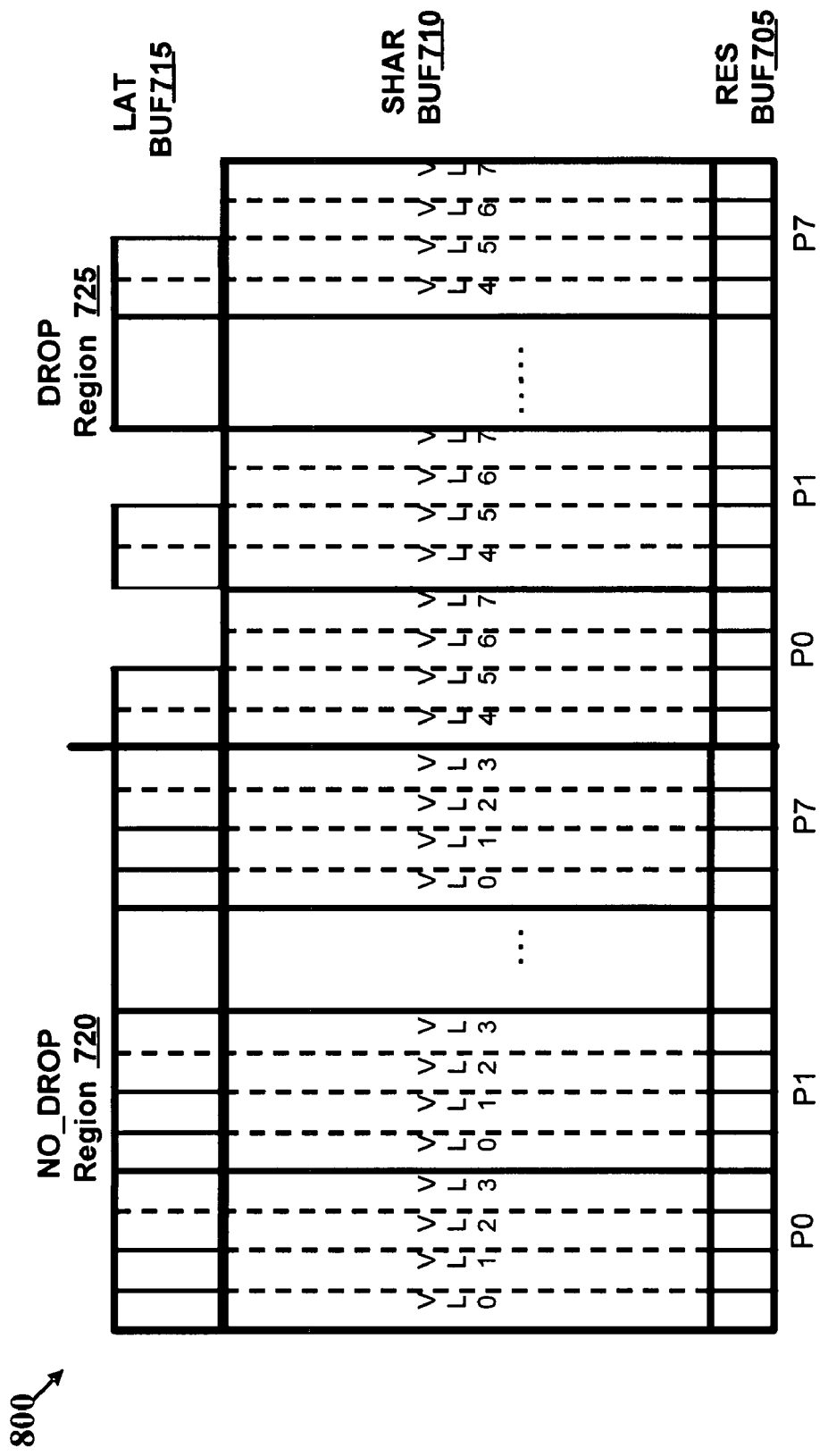
FIG. 8 illustrates how regions of a buffer may be apportioned according to another buffer allocation scheme.

Buffer 800 of FIG. 8 has been apportioned according to a somewhat different buffer allocation scheme. Here, virtual lanes 0 and 1 will be used to implement no drop traffic behavior with BCN, whereas virtual lanes 2 and 3 will be used to implement delayed drop traffic behavior with BCN. Virtual lanes 4 and 5 will be used to implement drop traffic behavior with pause, whereas virtual lanes 6 and 7 will be used to implement drop traffic behavior without pause.

In order to implement the pause mechanism, within drop region 725 portions of latency buffer space 715 are reserved for virtual lanes 4 and 5. In turn, virtual lanes 4 and 5 can share these portions of latency buffer space 715. Similarly, virtual lanes 2 and 3 can share reserved portions of latency buffer space 715 within no drop region 720. However, virtual lanes 0 and 1 do not share: they have a dedicated portion of latency buffer space 715. Moreover, unlike the example depicted in FIG. 7, ports P0 through P7 do not share portions of shared buffer space 710 in drop region 725.

Figure 9:
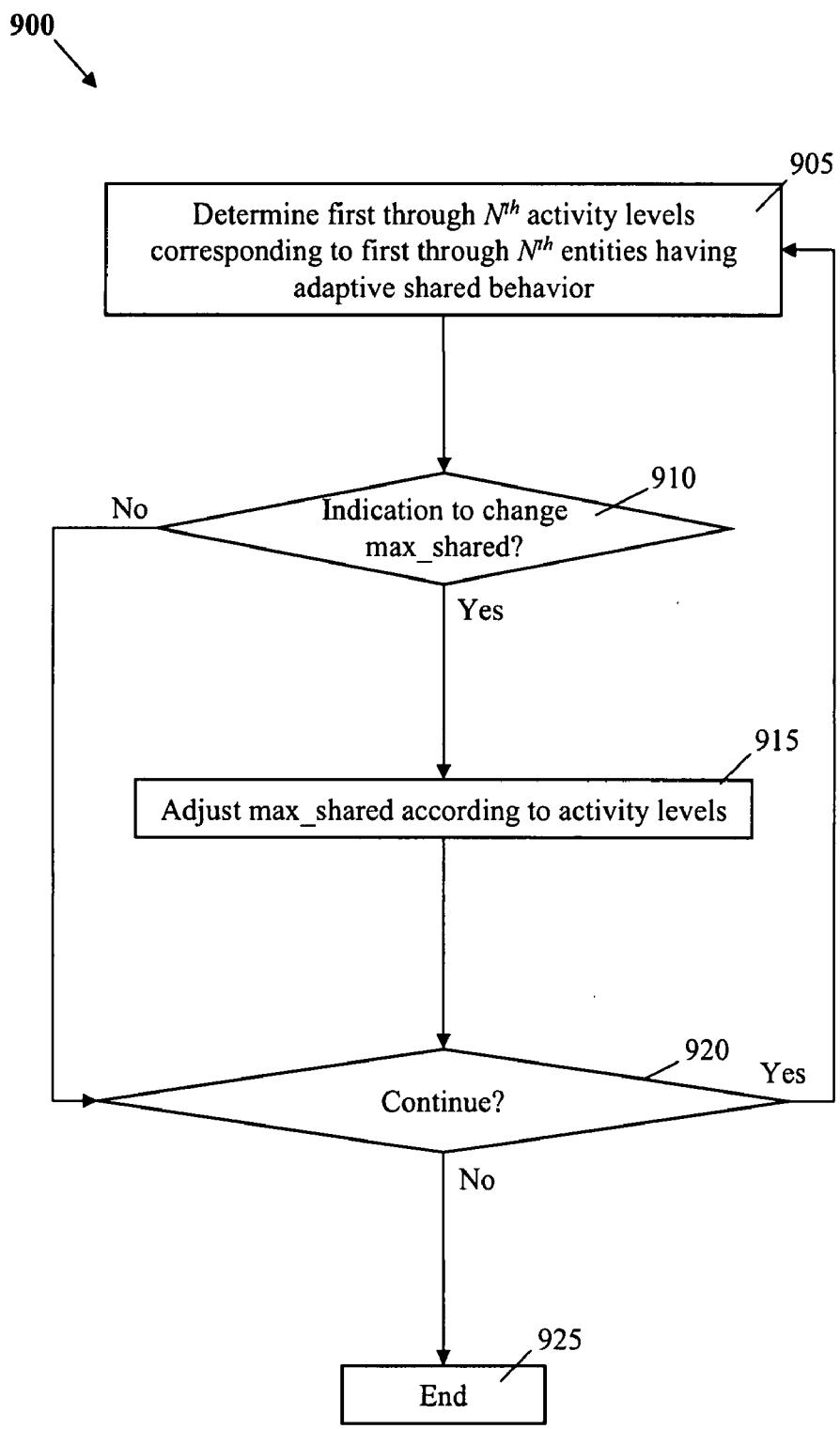
FIG. 9 is a flow chart that outlines some methods of buffer allocation involving entities with adaptive shared behavior.

Flow chart 900 of FIG. 9 illustrates steps that may be performed by components of a network device, such as line cards or the like, that have been configured according to some buffer allocation schemes described herein that involve "adaptive" shared behavior.

In step 905, first through $N^{th}$ activity levels are determined for first through $N^{th}$ entities having adaptive shared behavior. For example, the activity levels of ports P0 through P7 in shared buffer portion 710 of drop region 725 in FIG. 7 may be determined, if these entities have variable values of max_shared. In this example, then, N=8. The determination may involve an evaluation of whether the sub-entities associated with each entity have been active during a predetermined period of time.

In some such examples, step 905 may involve determining first through $M^{th}$ activity levels of first through $M^{th}$ sub-entities. Here, for example, step 905 involves a determination of how many of the virtual lanes corresponding to each of ports P0 through P7 have been active during a predetermined time. In this example, it is determined that ports P1 and P7 have relatively higher activity levels (with 3 and 4 active virtual lanes, respectively) as compared to ports P0 and P2 through P6 (having either no virtual lanes or 1 virtual lane active).

In step 910, it is determined whether there is an indication to change one or more max_shared values, according to a predetermined rule set. For example, step 910 may involve a determination as to how long the activity levels in question have persisted. In some implementations, for example, max_shared values will not be changed until activity levels have persisted for another predetermined length of time.

In some implementations, max_shared values may only be adjusted within a certain range. Here, for example, the applicable rule set may indicate that the max_shared value for each of ports P0 through P7 is limited to no more than, e.g., 25% of the shared buffer portion 710 in drop region 725. Similarly, the applicable rule set may indicate that the max_shared value for each of ports P0 through P7 must be at least a minimum value, e.g., 5% of the shared buffer portion 710 in drop region 725. Accordingly the determination of step 910 may also involve an evaluation of the present max_shared values of the entities involved and whether these present values can be increased or decreased.

In this example, each of ports P0 through P7 currently has a max_shared value corresponding to 15% of the shared buffer portion 710 of drop region 725. Moreover, the relative activity levels have persisted for a predetermined length of time. Therefore, the max_shared values will be adjusted in step 915. In this example, the max_shared values of port P1 and P7 are adjusted to 20% and 25%, respectively, of the shared buffer portion 710 of drop region 725. In this example, the adjustment is determined by starting with the minimum max_shared value of 5%, then adding 5% for each active entity. The remaining 55% is apportioned between ports P0 and P2 through P6, according to their relative activity levels.

This process may continue as needed. It is determined in step 920 whether to continue. In some implementations, the max_shared values of sub-entities may also be adaptive. Accordingly, process 900 may involve an evaluation of whether to change the max_shared values of, e.g., the virtual lanes corresponding to ports PI and P7.

Other Embodiments

The foregoing methods, along with other methods of the present invention, may be implemented by software, firmware and/or hardware. For example, at least some methods of the present invention may be implemented by computer programs embodied in machine-readable media, the software including instructions for controlling one or more devices to perform the method(s). Some aspects of the invention can be implemented by network devices or portions thereof.

Although illustrative embodiments and applications of this invention are shown and described herein, many variations and modifications are possible which remain within the concept, scope, and spirit of the invention, and these variations would become clear to those of ordinary skill in the art after perusal of this application. For example, although a substantial part of the foregoing discussion pertains to DCE networks, the implementations of the invention may be used in many other networks, including but not limited to Fibre Channel networks and high-speed Ethernet. Accordingly, the present embodiments are to be considered as illustrative and not restrictive, and the invention is not to be limited to the details given herein, but may be modified within the scope and equivalents of the appended claims.

We claim:

1. A method, comprising:
    receiving a first set of inputs indicating a first plurality of entities and a first traffic behavior implemented by each of the first plurality of entities;
    determining a first region of a buffer corresponding to the first traffic behavior;
    assigning the first plurality of entities to the first region;
    determining hierarchical relationships among the first plurality of entities implementing the first traffic behavior, wherein the hierarchical relationships are defined via a tree data structure;
    determining a first shared buffer space of the first region;
    assigning at least one threshold for each of the first plurality of entities, the threshold comprising a maximum amount of the first shared buffer space that may be allocated to an entity; and
    configuring a logic device to allocate the first shared buffer space dynamically according to the hierarchical relationships and the thresholds.

2. The method of claim 1, wherein the assigning step comprises assigning static thresholds.

3. The method of claim 1, wherein the assigning step comprises assigning adaptive thresholds for at least a portion of the first plurality of entities.

4. The method of claim 1, further comprising:
    receiving a second set of inputs indicating a second plurality of entities and a second traffic behavior implemented by the second plurality of entities;
    determining a second region of the buffer corresponding to the second traffic behavior; and
    assigning the second plurality of entities to the second region.

5. The method of claim 1, further comprising determining that the first traffic behavior is the only traffic behavior implemented by the first plurality of entities, wherein step of determining the first region of the buffer comprises determining that the first region comprises all of the buffer.

6. The method of claim 1, wherein the configuring step comprises configuring the logic device to allocate an entity's buffer space among sub-entities of the entity.

7. The method of claim 1, further comprising determining a reserved buffer space for each of the first plurality of entities.

8. The method of claim 1, wherein the first traffic behavior is no drop behavior, the method further comprising establishing a latency buffer space within the first region, the latency buffer space reserved for implementing a flow control mechanism.

9. The method of claim 3, further comprising configuring the logic device to determine activity levels of the portion of the first plurality of entities and to change the adaptive thresholds according to determined activity levels.

10. The method of claim 9, wherein determining activity levels comprises determining a number of active entities in the first plurality of entities.

11. The method of claim 1, wherein a minimum amount of the first region of the buffer is reserved for each of the first plurality of entities.

12. The method of claim 1, wherein entities at a same level of the tree data structure share a corresponding sub-region of the first region of the buffer.

13. The method of claim 12, wherein buffer space of an entity is shared among sub-entities of the entity.

14. The method of claim 1, wherein buffer space reserved for an entity is determined by a sum of amounts of buffer space reserved for child nodes of the entity.

15. The method of claim 1, wherein the first plurality of entities are not at the same level of the tree data structure.

16. The method of claim 1, wherein the first plurality of entities are at two or more levels of the tree data structure.

17. An apparatus, comprising:
    means for receiving a first set of inputs indicating a first plurality of entities and a first traffic behavior implemented by each of the first plurality of entities;
    means for determining a first region of a buffer corresponding to the first traffic behavior;
    means for assigning the first plurality of entities to the first region;
    means for determining hierarchical relationships among the first plurality of entities implementing the first traffic behavior, wherein the hierarchical relationships are defined via a tree data structure;
    means for determining a first shared buffer space of the first region;
    means for assigning at least one threshold for each of the first plurality of entities, the threshold comprising a maximum amount of the first shared buffer space that may be allocated to an entity; and
    means for configuring a logic device to allocate the first shared buffer space dynamically according to the hierarchical relationships and the thresholds.

18. The method of claim 17, wherein the assigning means comprises means for assigning adaptive thresholds for at least a portion of the first plurality of entities.

19. The method of claim 17,
    wherein the receiving means comprises means for receiving a second set of inputs indicating a second plurality of entities and a second traffic behavior implemented by the second plurality of entities;
    wherein the determining means comprises means for determining a second region of a buffer corresponding to the second traffic behavior; and
    wherein the assigning means comprises means for assigning the second plurality of entities to the second region.

20. An apparatus, comprising:
    a first plurality of ports;
    a buffer; and
    a logic device configured to do the following:
        obtain a first set of inputs indicating a first plurality of entities and a first traffic behavior implemented by each of the first plurality of entities;
        determine a first region of a buffer corresponding to the first traffic behavior;
        assign the first plurality of entities to the first region;
        determine hierarchical relationships among the first plurality of entities implementing the first traffic behavior, wherein the hierarchical relationships are defined via a tree data structure;
        determine a first shared buffer space of the first region;

assign at least one threshold for each of the first plurality of entities, the threshold comprising a maximum amount of the first shared buffer space that may be allocated to an entity; and configure a logic device to allocate the first shared buffer space dynamically according to the hierarchical relationships and the thresholds.

21. The apparatus of claim 20, wherein the logic device is further configured to modify a maximum amount of the shared portion of the buffer that is allocated to each port according to a corresponding port activity level.

22. The apparatus of claim 20, wherein the logic device is further configured to do the following:

determine a traffic behavior for a frame received via one of the plurality of ports; and store the frame in a region of the buffer corresponding to the traffic behavior that has been determined.

23. The apparatus of claim 20, wherein the logic device is further configured to allocate a port's buffer space among sub-entities of the port.

24. The apparatus of claim 22, wherein the traffic behavior is no drop traffic behavior and wherein the region is a no drop region.

25. The apparatus of claim 24, wherein no drop region comprises a latency buffer space reserved for implementing a flow control mechanism and wherein the logic device is configured for implementing, at least in part, the flow control mechanism.

* * * * *